Patented Jan. 20, 1942

2,270,669

UNITED STATES PATENT OFFICE 2,270,669

PROCESS FOR THE PRODUCTION OF ISOBUTANE

Martin de Simo, Piedmont, and Frank Matthew McMillan, Berkeley, Calif., assignors to Shell Development Company, San Francisco, Calif., a corporation of Delaware No Drawing. Application September 29, 1939, Serial No. 297,104

8 Claims. (Cl. 260—676)

The present invention relates to a process for the production of isobutane.

An object of the invention is to provide a process whereby isobutane may be produced in any desired quantities from readily available and inexpensive lower molecular weight saturated hydrocarbons, especially propane. A further object is to provide a process whereby more valuable hydrocarbons may be produced from propane via isobutane.

Isobutane is a most useful hydrocarbon. It is quite chemically reactive and finds extensive use in alkylation reactions. It is, furthermore, easily dehydrogenated to isobutylene, which in turn is an excellent starting material for the synthesis of a wide variety of useful and valuable products. It also possesses excellent ignition characteristics and is very desirable in limited amounts in motor fuels for internal combustion engines. Isobutane does not, however, occur to any appreciable extent in nature and must be produced. At present, virtually the entire supply of isobutane is either recovered from cracked gases or produced from normal butane by isomerization.

In its broader aspect, the process of the present invention consists essentially in contacting a hydrocarbon feed containing propane with a suitable catalyst in the presence of a hydrogen halide promoter under reaction conditions. Isobutane is produced by one or a series of disproportionation reactions. While we do not desire our invention to be limited by the soundness or accuracy of any theories advanced to explain the advantageous results obtained, the following are the principal reactions which appear to take place.

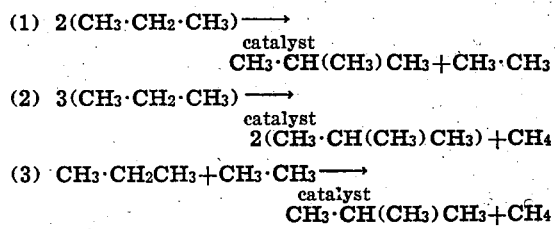

As will be apparent from the foregoing overall reaction equations, the isobutane is formed either from propane, according to Equations 1 and 2, or from propane and ethane, according to Reaction 3. When the hydrocarbon being treated is pure propane or a fraction consisting predominantly of propane, the greater part of the isobutane produced appears to be formed via Reactions 1 and 2. If, on the other hand, the hydrocarbon being treated contains a substantial proportion of ethane, appreciable quantities of isobutane can be formed via Reaction 3. Thus, isobutane may be produced, according to the process of our invention, either from pure propane, a hydrocarbon fraction consisting predominantly of propane, or a mixture containing propane with ethane and/or methane. The feed may also contain inert gases such as $N_2$, $CO_2$, $H_2$, etc. and/or a certain amount of butane.

The hydrocarbon feed is, however, preferably substantially free of olefines, normally liquid paraffin hydrocarbons, and/or other impurities known to be readily reacted with or detrimental to Friedel-Crafts catalysts. Olefines, if present in the feed stock, are preferably first removed by conventional treatment, such as by hydrogenation, acid refining, or the like. Pentane, hexane, and other higher aliphatic hydrocarbons, if present, are preferably first removed by absorption, fractionation, or the like.

The reaction is preferably executed with the aid of a Friedel-Crafts type catalyst, such in particular as aluminum chloride. Although aluminum chloride, in general, is the most economical and efficient catalyst, such other acid-acting halide catalysts as exert a catalytic influence in hydrocarbon reactions, e. g. the halides of Be, Zn, Zr, Nb, Ta, Sb, and B, may also, if desired, be employed. Very suitable catalyst combinations are mixtures of an aluminum halide with a free metal of the group consisting of Al, Be, Mg, Zn, Cu, and Fe.

In the preferred embodiment of the invention, the catalyst is employed supported upon a suitable carrier and in the form of granules, pellets, rings, macaronis, or the like of suitable size. Very effective catalysts are produced by supporting aluminum chloride on adsorbent carrier materials, such, for instance, as adsorbent alumina, diatomaceous earths, adsorbent charcoal, and the like. Particularly effective catalysts are prepared by supporting anhydrous aluminum chloride on "Activated alumina," as described in copending application No. 292,295 filed August 28, 1939.

The present process is preferably executed in the presence of at least a small amount of a hydrogen halide. It is known that the catalytic activity of the aluminum halides and other Friedel-Crafts type catalysts is greatly increased by the presence of a hydrogen halide. Thus, it is found that the rate of isobutane production, using these catalysts, is, in general, increased markedly by the presence of even relatively small quantities (for instance, 0.1%) of a hydrogen halide. Larger amounts, such as from about 1% to 10% by volume of hydrogen halide, are, however, more effective and usually employed.

The production of isobutane, according to the present process, takes place, in general, at an appreciable rate only at temperatures above about 100° C. As the temperature is increased, the reaction rate steadily increases until a point is reached, depending upon the activity of the catalyst, the throughput velocity, the amount of hydrogen halide present, the presence or absence of hydrogen, etc., where excessive decomposition takes place with the formation of tars and carbon. The process is most advantageously executed at a temperature above about 150° C. but below that at which excessive decomposition takes place.

The reaction may be executed at any pressure from subatmospheric up to as high as desired. When using aluminum chloride as the catalyst, superatmospheric pressures, such as from about 2 to about 50 atmospheres, are somewhat preferred, since under these pressures the loss of aluminum chloride from the catalyst by volatilization is substantially avoided.

In the preferred method of executing the process, the hydrocarbon feed containing propane and a hydrogen halide is passed as a vapor through a reaction chamber packed with catalyst and maintained at the desired temperature. When operating in this manner, the amount of isobutane produced per pass depends upon the activity of the catalyst, the composition of the hydrocarbon mixture being treated, the space velocity, and the temperature. In general, when lower temperatures are employed, lower space velocities, such as from 0.5 to 7 mols/liter/hr., are somewhat more advantageous. At higher temperatures much higher space velocities, such as from 7 to 12 mols/liter/hr. or higher may be employed.

The reaction product from the reactor contains isobutane, unconverted propane, ethane, methane, hydrogen halide, and a small amount of normal butane. This reaction product may be handled in any one of several ways. It may, for example, be conveniently fractionated into two or more fractions, such, for instance, as a butane fraction, a propane-ethane fraction, and a less condensible gas fraction. Such a fractionation may be executed in the customary way by direct fractionation under pressure or, if desired, may be preceded by an absorption treatment. After removing the isobutane from the reaction mixture and, if desired, some or all of the less condensible gases, the remaining hydrocarbon, containing unconverted propane and some or all of the ethane, is preferably retreated, for instance by recycling through the system mixed with the incoming fresh feed.

Another convenient and advantageous method for effecting the separation or recovery of the isobutane from the product is by chemical means. Thus, the product, either per se or after preliminary rough fractionation or absorption treatment, may be fed to an alkylation unit wherein the isobutane of the mixture is reacted with olefine hydrocarbons in the known manner. When combined with an alkylation process, the present process is most advantageous since in this manner cheap and available hydrocarbon gases containing appreciable quantities of propane may be utilized directly in the production of valuable motor fuels, the isobutane produced from the propane is utilized to the best advantage, and the separation and recovery of the isobutane per se from the reaction product is eliminated.

The isobutane produced according to the present process, unless subjected to very close fractionation, contains a certain proportion of normal butane. This is, no doubt, formed from the isobutane by isomerization during the reaction. The small amount of normal butane formed is not detrimental. If desired, it may be recycled through the reactor in which case the process will operate continuously with a small fixed quantity of normal butane in the system.

The following examples, which illustrate the production of isobutane from propane by static and dynamic methods, are presented solely to illustrate the invention and are not to be considered as limiting the invention in any manner.

*Example I*

Propane containing 2 mol % of hydrogen chloride was passed at a space velocity of 1.5 mols/liter/hr. and under a pressure of 10 atmospheres through a reaction chamber filled with catalyst and maintained at 160° C. The catalyst was prepared by impregnating pieces of 6 to 8 mesh "activated alumina" with molten aluminum chloride under pressure and contained 30% by weight aluminum chloride. The reaction product after a single pass contained 5.0 mol % isobutane and about 2.5 mol % of normal butane.

*Example II*

Propane containing 2 mol % of hydrogen chloride was passed at a space velocity of 3 mols/liter/hr. and under a pressure of 10 atmospheres through a reaction chamber filled with catalyst and maintained at a temperature of 140° C. The catalyst was the same as that described in Example I. The reaction product after a single pass contained 2.9 mol % isobutane and 1.3 mol % normal butane.

*Example III*

Pure propane containing 10 mol % hydrogen chloride was heated at 200° C. and 960–800 lbs./in.$^2$ for three hours with a supported aluminum chloride catalyst. The catalyst was prepared by impregnating pieces of "activated alumina" with vapors of aluminum chloride and contained about 16% by weight aluminum chloride. The reaction product contained, besides unconverted propane, 11.2 mol % of isobutane containing some normal butane, 12.5 mol % methane and 16.6 mol % ethane.

*Example IV*

Pure propane was heated at 100° C. for 330 hours in the presence of aluminum bromide in a closed vessel. The reaction product was found to contain, besides unconverted propane, 13 mol % of isobutane containing some n-butane, 1% of hydrocarbons boiling above n-butane, and 27% of hydrocarbons boiling below propane.

While we have described our invention in a clear and concise manner and have given examples illustrating specific embodiments thereof, we are aware that numerous modifications will be readily apparent to those skilled in the art. It is to be understood, therefore, that no limitations are intended other than those imposed by the scope of the appended claims.

We claim as our invention:

1. A process for the production of isobutane from lower molecular weight saturated hydrocarbons which comprises passing propane vapor along with a hydrogen halide over a supported aluminum chloride catalyst maintained at a temperature above about 100° C. but not substantially in excess of 200° C. and separating isobutane from the reaction mixture.

2. A process for the production of isobutane from lower molecular weight saturated hydrocarbons which comprises the steps of disproportionating propane with the aid of an aluminum halide catalyst and a hydrogen halide at a temperature above about 100° C. but not substantially in excess of 200° C., and separating isobutane from the reaction mixture.

3. A process for the production of isobutane from lower molecular weight saturated hydrocarbons which comprises the steps of disproportionating propane with the aid of a Friedel-Crafts type catalyst and a hydrogen halide at a temperature above about 100° C. but not substantially in excess of 200° C., and separating isobutane from the reaction mixture.

4. A process for the production of isobutane from lower molecular weight saturated hydrocarbons which comprises continuously passing propane vapors along with a hydrogen halide over a supported acid-acting metal halide catalyst maintained at a temperature above about 100° C. but not substantially in excess of 200° C., and removing isobutane from the reaction mixture by reaction with an olefine.

5. A process for the production of isobutane from lower molecular weight saturated hydrocarbons which comprises the steps of disproportionating propane with the aid of an acid-acting metal halide catalyst and a hydrogen halide at a temperature above about 100° C. but not substantially in excess of 200° C., and separating isobutane from the reaction mixture.

6. A process for the production of isobutane from lower molecular weight saturated hydrocarbons which comprises passing propane vapor along with a hydrogen halide over a supported acid-acting metal halide catalyst maintained at a temperature above about 100° C. but not substantially in excess of 200° C., separating isobutane from the reaction mixture, and recycling a portion of the unconverted hydrocarbon.

7. A process for the production of isobutane from lower molecular weight saturated hydrocarbons which comprises passing propane, ethane, and hydrogen chloride in the vapor phase over a supported acid-acting metal halide catalyst maintained at a temperature above about 100° C. but not substantially in excess of 200° C., and separating isobutane from the reaction mixture.

8. A process for the production of isobutane from lower molecular weight saturated hydrocarbons which comprises passing a lower molecular weight saturated hydrocarbon having at least two carbon atoms in the vapor phase over a supported aluminum halide catalyst maintained at a temperature above about 100° C. but not substantially in excess of 200° C., and separating isobutane from the reaction mixture.

MARTIN DE SIMO.
FRANK MATTHEW McMILLAN.